(12) United States Patent
Wei

(10) Patent No.: US 10,848,678 B2
(45) Date of Patent: Nov. 24, 2020

(54) IMAGE SYNTHESIS METHOD AND APPARATUS FOR MOBILE TERMINAL, AND MOBILE TERMINAL

(71) Applicant: GUANGDONG OPPO MOBILE TELECOMMUNICATIONS CORP., LTD., Guangdong (CN)

(72) Inventor: Yi Wei, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 119 days.

(21) Appl. No.: 16/302,323

(22) PCT Filed: Jun. 9, 2017

(86) PCT No.: PCT/CN2017/087806
§ 371 (c)(1),
(2) Date: Nov. 16, 2018

(87) PCT Pub. No.: WO2018/019039
PCT Pub. Date: Feb. 1, 2018

(65) Prior Publication Data
US 2019/0306429 A1 Oct. 3, 2019

(30) Foreign Application Priority Data

Jul. 29, 2016 (CN) .......................... 2016 1 0616090

(51) Int. Cl.
*H04N 5/232* (2006.01)
*H04N 5/265* (2006.01)
(Continued)

(52) U.S. Cl.
CPC ......... *H04N 5/23287* (2013.01); *H04N 5/232* (2013.01); *H04N 5/23212* (2013.01);
(Continued)

(58) Field of Classification Search
CPC .......... H04N 5/23287; H04N 5/36961; H04N 9/04551; H04N 5/232122; H04N 5/232;
(Continued)

(56) References Cited

U.S. PATENT DOCUMENTS 10,554,877 B2 * 2/2020 Wei ..................... H04N 5/2327
2011/0013061 A1 1/2011 Hoda et al.
(Continued)

FOREIGN PATENT DOCUMENTS

CN  1921571     2/2007
CN  102238329   11/2011
(Continued)

OTHER PUBLICATIONS

EPO, Office Action for EP Application No. 17833343.1, dated Jan. 16, 2020.
(Continued)

*Primary Examiner* — Twyler L Haskins
*Assistant Examiner* — Fayez Bhuiyan
(74) *Attorney, Agent, or Firm* — Hodgson Russ LLP

(57) ABSTRACT

An image synthesis method for a mobile terminal and the mobile terminal are provided. The method includes: performing a phase focusing on an object to be photographed based on a preset pixel of a photosensitive element in the mobile terminal when a user photographs the object to be photographed with the mobile terminal; controlling the photosensitive element to generate a displacement at an initial location to replace the preset pixel by an original pixel, and obtaining a replaced pixel; collecting first photosensitive data of the object to be photographed based on the replaced pixel, and controlling the photosensitive element to return to the initial location; photographing the object to be photographed, and enabling the photosensitive element to collect second photosensitive data of the object to be photographed at the initial location; and synthesizing an image of the object to be photographed according to the first and second photosensitive data.

20 Claims, 4 Drawing Sheets

(51) Int. Cl.
*H04N 9/04* (2006.01)
*H04N 5/349* (2011.01)
*H04N 5/369* (2011.01)

(52) U.S. Cl.
CPC ..... *H04N 5/23258* (2013.01); *H04N 5/23267* (2013.01); *H04N 5/232122* (2018.08); *H04N 5/265* (2013.01); *H04N 5/349* (2013.01); *H04N 5/3696* (2013.01); *H04N 5/36961* (2018.08); *H04N 9/04551* (2018.08)

(58) Field of Classification Search
CPC ........... H04N 5/23212; H04N 5/23258; H04N 5/23267; H04N 5/265; H04N 5/349; H04N 5/3696
See application file for complete search history.

(56) References Cited

U.S. PATENT DOCUMENTS

| | | | |
|---|---|---|---|
| 2013/0156345 A1 | 6/2013 | Shmunk | |
| 2014/0354833 A1 | 12/2014 | Takizawa | |
| 2015/0109513 A1* | 4/2015 | Nayar | G02B 27/646 |
| | | | 348/349 |
| 2015/0212336 A1 | 7/2015 | Hubert et al. | |
| 2015/0229843 A1 | 8/2015 | Shimizu | |

FOREIGN PATENT DOCUMENTS

| | | |
|---|---|---|
| CN | 203535350 | 4/2014 |
| CN | 105007420 | 10/2015 |
| CN | 105007422 | 10/2015 |
| CN | 105008976 | 10/2015 |
| CN | 105590939 | 5/2016 |
| CN | 105763766 | 7/2016 |
| CN | 105814484 | 7/2016 |
| CN | 106101556 | 11/2016 |
| JP | 2011075677 | 4/2011 |
| WO | 2014003492 | 1/2014 |
| WO | 2014014222 | 1/2014 |
| WO | 2014097792 | 6/2014 |
| WO | 2016099128 | 6/2016 |

OTHER PUBLICATIONS

EPO, Office Action for EP Application No. 17833343.1, dated Sep. 12, 2019.
WIPO, ISR for CN Application No. PCT/CN2017/087806, Aug. 18, 2017.
SIPO, First Office Action for CN Application No. 201610616090, dated May 15, 2017.
USPTO, Office Action for U.S. Appl. No. 16/240,348, dated Apr. 18, 2019.
EPO, Comunication for EP Application No. 17833343.1, dated Sep. 2, 2020.
IPI, Office Action for IN Application No. 201917002002, dated Aug. 14, 2020.

* cited by examiner

IMAGE SYNTHESIS METHOD AND APPARATUS FOR MOBILE TERMINAL, AND MOBILE TERMINAL

CROSS-REFERENCE TO RELATED APPLICATIONS

The present application is a U.S. national phase application of International Application No. PCT/CN2017/087806, filed on Jun. 9, 2017, which claims priority from Chinese Patent Application No. "201610616090.6" filed on Jul. 29, 2016 by GUANGDONG OPPO MOBILE TELECOMMUNICATIONS CORP., LTD., entitled "Image Synthesis Method and Device for Mobile Terminal, and Mobile Terminal".

TECHNICAL FIELD

The present disclosure relates to a field of mobile terminal technology, and in particular, to an image synthesis method and apparatus for a mobile terminal, and a mobile terminal.

BACKGROUND

Optical Image Stabilization (OIS) may effectively avoid image blur caused by jitter during a process of the user taking pictures with a mobile terminal. OIS uses a magnetically wrapped suspension lens to effectively overcome image blur caused by vibration of the mobile terminal. In the related art, the anti-shake is realized by a photosensitive element, of which the principles may be described as followings. The photosensitive element is fixed on a bracket that can move up, down, left, and right, and the direction and amplitude data of the shaking of the mobile terminal are sensed by a gyro sensor. After that, the gyro sensor transmits the data. Screening and amplification are performed on the data at the processor side to calculate the amount of movement of the photosensitive element that may compensate the jitter. During the process of the user taking pictures with the mobile terminal, it is also necessary to perform phase focusing on the scene to be photographed. In the related art, by hiding some masked pixels on the photosensitive element, and considering the distance between the pixels of the scene to be photographed and its changing factors, the focusing offset value may be determined to achieve the phase focusing.

In this way, the masked pixels may only be used to detect the phase and cannot be used to display the image. The masked pixels may affect the quality of the image photographed. The higher the density of the masked pixels, the more accurate the phase focusing, but the worse the quality of the image photographed.

SUMMARY

The present disclosure aims to solve at least one of technical problems in the related art to some extent.

Embodiments of the present disclosure provide an image synthesis method for the mobile terminal. The method may include: performing a phase focusing on an object to be photographed based on a preset pixel of a photosensitive element in the mobile terminal when a user photographs the object to be photographed with the mobile terminal; controlling the photosensitive element to generate a displacement at an initial location to replace the preset pixel by an original pixel, and obtaining a replaced pixel; collecting first photosensitive data of the object to be photographed based on the replaced pixel, and controlling the photosensitive element to return to the initial location; photographing the object to be photographed, and enabling the photosensitive element to collect second photosensitive data of the object to be photographed at the initial location; and synthesizing an image of the object to be photographed according to the first photosensitive data and the second photosensitive data.

Embodiments of the present disclosure also provide a micro-electromechanical optical image stabilization system. The system may include: a photosensitive element, configured to collect photosensitive data of an object to be photographed; and a micro-electromechanical system (MEMS), configured to control the photosensitive element to generate a displacement at an initial position.

Embodiments of the present application propose a storage medium, when instructions stored in the storage medium are executed by a processor of a mobile terminal, the mobile terminal is caused to perform an image synthesis method for the mobile terminal. The image synthesis method may include: performing a phase focusing on an object to be photographed based on a preset pixel of a photosensitive element in the mobile terminal when a user photographs the object to be photographed with the mobile terminal; controlling the photosensitive element to generate a displacement at an initial location to replace the preset pixel by an original pixel, and obtaining a replaced pixel; collecting first photosensitive data of the object to be photographed based on the replaced pixel, and controlling the photosensitive element to return to the initial location; photographing the object to be photographed, and enabling the photosensitive element to collect second photosensitive data of the object to be photographed at the initial location; and synthesizing an image of the object to be photographed according to the first photosensitive data and the second photosensitive data.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

In order to make technical solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technical solutions in embodiments of the present disclosure are hereinafter described clearly and completely with reference to accompanying drawings in embodiments of the present disclosure. Apparently, embodiments described are a part of embodiments of the present disclosure, but not all embodiments. All other embodiments obtained by those skilled in the art based on the embodiments in the present disclosure without creative labor shall fall in the protection scope of the present disclosure.

The terms "first", "second", "third" and "fourth" and the like in the specification and claims of the present disclosure and the above drawings are used to distinguish different objects, and are not intended to describe a specific order. Moreover, the terms "comprise" and "have" and their variants are aim at covering non-exclusive "include". For example, a process, a method, a system, a term or a device including a series of steps or units may be not limited to the listed steps or units, instead and alternatively, other steps or units which are not listed may be included, or other steps or units inherent for these process, method, term or device may be included in an embodiment.

Figure 1:
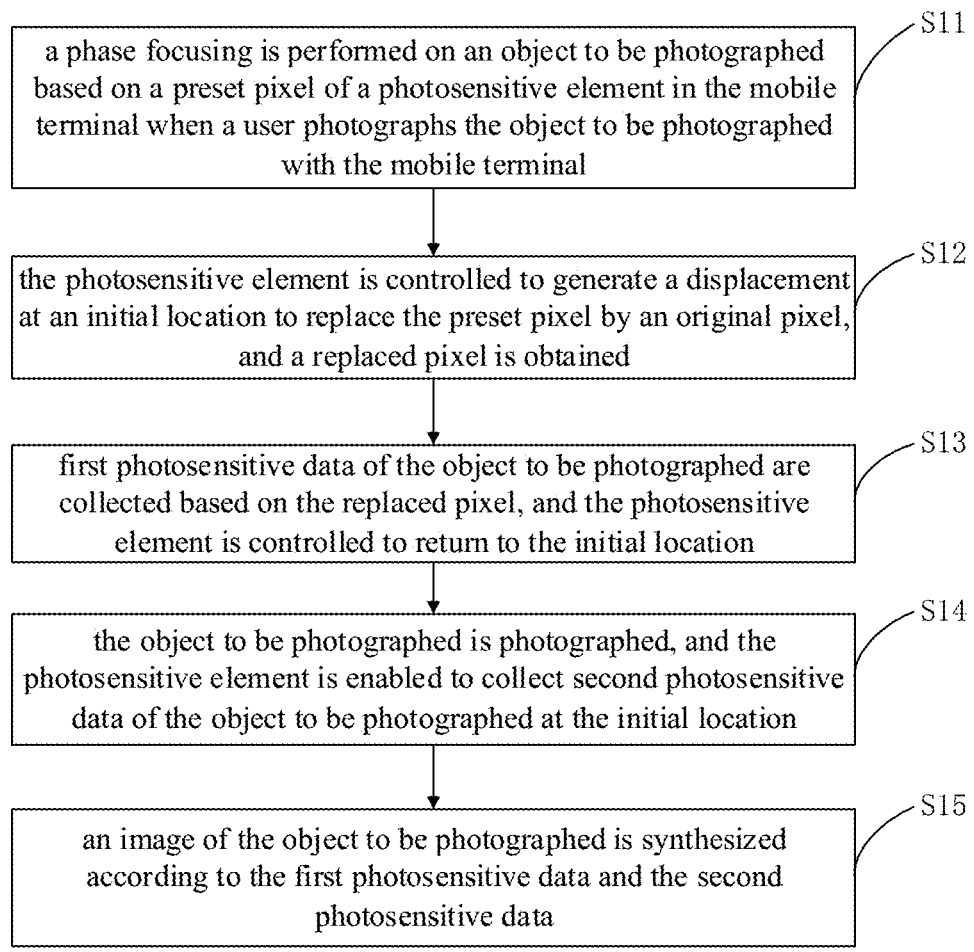
FIG. 1 is a schematic flow chart of an image synthesis method for a mobile terminal according to an embodiment of the present disclosure.

FIG. 1 is a schematic flow chart of an image synthesis method for a mobile terminal according to an embodiment of the present disclosure. This embodiment takes an example where an image synthesis method for the mobile terminal is configured for an image synthesis apparatus for the mobile terminal. Embodiments of the present disclosure may be applied during a process of a user paragraphing a subject to be photographed using the mobile terminal.

Referring to FIG. 1, the image synthesis method of the mobile terminal may include followings.

At block S11, a phase focusing is performed on an object to be photographed based on a preset pixel of a photosensitive element in the mobile terminal when a user photographs the object to be photographed with the mobile terminal.

In embodiments of the present disclosure, the mobile terminal may be a hardware device having various operating systems, such as a smart phone, a tablet computer, a personal digital assistant, an e-book and the like, which is not be limited herein.

In embodiments of the present disclosure, the object to be photographed may be a scene, a person, a thing and the like to be photographed by the user with the mobile terminal.

In embodiments of the present disclosure, the preset pixels are masked pixels, and the preset pixels are set in pairs.

In an embodiment, when the user photographs the object to be photographed with the mobile terminal, a phase focusing is performed on the object to be photographed based on the preset pixel of the photosensitive element in the mobile terminal. In other words, by reserving some masked pixels on the photosensitive element, the focusing offset value may be determined according to the distance between the pixels of the scene to be photographed and its changing factors, thereby achieving the phase focusing.

Figure 2:
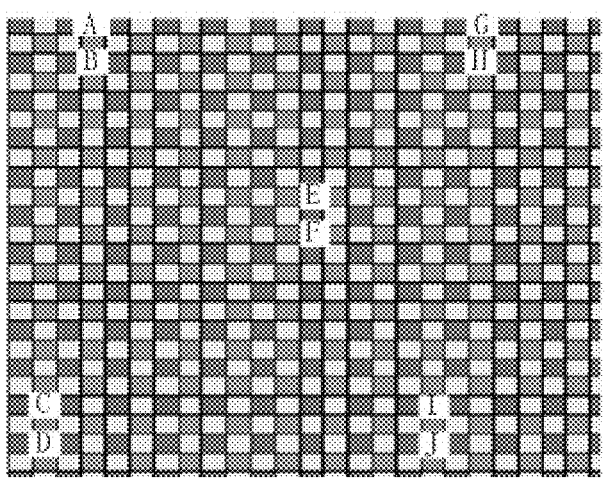
FIG. 2 is a schematic diagram of preset pixels on a photosensitive element in an embodiment of the present disclosure.

Referring to FIG. 2, FIG. 2 is a schematic diagram of preset pixels on a photosensitive element according to an embodiment of the present disclosure. For example, the pixels marked with letters in FIG. 2 may be preset pixels, and the preset pixels are set in pairs. For example, the preset pixels A, B, C, D, E, F, H, I, J may be marked as a preset pixel pair A and B, a preset pixel pair C and D, a preset pixel pair E and F, a preset pixel pair G and H, and a preset pixel pair I and J.

At block S12, the photosensitive element is controlled to generate a displacement at an initial location to replace the preset pixel by an original pixel, and a replaced pixel is obtained.

In embodiments of the disclosure, the photosensitive element may be controlled to generate a displacement at the initial position by a micro-electromechanical optical image stabilization system.

In embodiments of the present disclosure, the initial position is a position of the photosensitive element in the mobile terminal when the phase focusing is performed on the object to be photographed based on the preset pixel of the photosensitive element in the mobile terminal in the act of block S11.

In embodiments of the present disclosure, the original pixel may be, for example, a default pixel when a masked pixel is not reserved on the photosensitive element in the mobile terminal, and the original pixel is, for example, a default pixel adjacent to the preset pixel.

In an embodiment, the movement of the photosensitive element may be controlled by the micro-electromechanical optical image stabilization system, such that the photosensitive element generates the displacement at the initial position to replace masked pixels by original pixels to obtain replaced pixels.

As an example, referring to FIG. 2, the pixels marked with letters in FIG. 2 are masked pixels, and after the micro-electromechanical optical image stabilization system controls the photosensitive element to generate displacement at the initial position, the replaced pixels may be obtained. In other words, by moving the position of the photosensitive element located under the color filter array, the movement of the photosensitive element relative to the color filter array may be caused, such that the photosensitive pixels corresponding to the same filter position before and after the movement are different, and the positions of those preset pixels (reserved masked pixels) before the movement are replaced by the original pixels (default pixels) after the movement.

At block S13, first photosensitive data of the object to be photographed are collected based on the replaced pixel, and the photosensitive element is controlled to return to the initial location.

In embodiments of the present disclosure, the first photosensitive data are photosensitive data collected when the mobile terminal photographs the object to be photographed based on the replaced pixels after the photosensitive element in the mobile terminal generates the displacement of at the initial position.

In embodiments of the present disclosure, after the first photosensitive data is collected, the photosensitive element may be controlled to return to the initial position to photograph the object to be photographed based on the preset pixel.

At block S14, the object to be photographed is photographed, and the photosensitive element is enabled to collect second photosensitive data of the object to be photographed at the initial location.

In embodiments of the present disclosure, when the photosensitive element is controlled to return to the initial position, the object to be photographed is photographed based on the preset pixel, such that the photosensitive element collects the photosensitive data of the object to be photographed at the initial position as the second photosensitive data.

In embodiments of the present disclosure, since the photosensitive element generates the displacement at the initial position, the original pixel is used to replace the masked pixel on the photosensitive element, and the obtained replaced pixel is the original pixel. Therefore, the mobile terminal may perform a compensation on the second photographic data based on the first photographic data so as to compensate for the masked pixel.

At block S15, an image of the object to be photographed is synthesized according to the first photosensitive data and the second photosensitive data.

In embodiments of the present disclosure, the second photosensitive data are subjected to compensation processing using the first photosensitive data to synthesize an image of the object to be photographed according to the compensated second photosensitive data.

In this embodiment, the photosensitive element is controlled to generate a displacement at an initial position to replace the preset pixel by an original pixel and a replaced pixel is obtained. First photosensitive data of the object to be photographed may be collected based on the replaced pixel and the photosensitive element is controlled to return to the initial location, and the object to be photographed may be photographed, and the photosensitive element is enabled to collect second photosensitive data of the object to be photographed at the initial location. An image of the object to be photographed is synthesized according to the first photosensitive data and the second photosensitive data. Therefore, the accuracy of phase focusing may be effectively improved, masked pixels may be compensated, and image blur caused by vibration of the mobile terminal may be effectively overcome.

Figure 3:
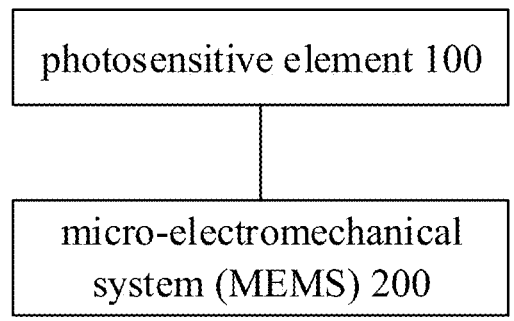
FIG. 3 is a schematic structural diagram of a micro-electromechanical optical image stabilization system according to an embodiment of the present disclosure.

FIG. 3 is a schematic structural diagram of a micro-electromechanical optical image stabilization system according to an embodiment of the present disclosure.

Referring to FIG. 3, the micro-electromechanical optical image stabilization system may include a photosensitive element 100 and a micro-electromechanical system (MEMS) 200. The photosensitive element 100 is configured to collect photosensitive data of an object to be photographed. The MEMS 200 is coupled to the photosensitive element and configured to control the photosensitive element 100 to generate a displacement at an initial position.

In embodiments of the disclosure, the micro-electromechanical optical image stabilization system may include the photosensitive element 100.

The photosensitive element 100 is configured to collect photosensitive data of the object to be photographed.

In an embodiment, a masked pixel is set on the photosensitive element 100, in which the masked pixel is used to perform a phase focusing on the object to be photographed.

In an embodiment, when the user uses the mobile terminal to photograph the object to be photographed, the phase focusing may be performed on the object to be photographed based on the preset pixel on the photosensitive element 100 in the mobile terminal. In other words, by reserving some masked pixels on the photosensitive element, the focusing offset value may be determined according to the distance between the pixels of the scene to be photographed and its changing factors, thereby achieving the phase focusing.

In embodiments of the disclosure, the micro-electromechanical optical image stabilization system may also include the MEMS 200.

The MEMS 200 is coupled to the photosensitive element and configured to control the photosensitive element 100 to generate the displacement at the initial position.

In embodiments of the present disclosure, the initial position is the position of the photosensitive element in the mobile terminal when the phase focusing is performed on an object to be photographed based on a preset pixel of a photosensitive element in the mobile terminal in act of block S11 in the embodiment shown in FIG. 1.

In an embodiment, the photosensitive element 100 and the MEMS 200 are coupled using a chip-on-board technology and a dispensing method.

In embodiments of the present disclosure, the MEMS 200 may be used to carry the photosensitive element 100, and the photosensitive element 100 may be moved in a three-axis direction of the space rectangular coordinate system to provide an anti-shake function during the process of photographing with the mobile terminal.

Figure 4:
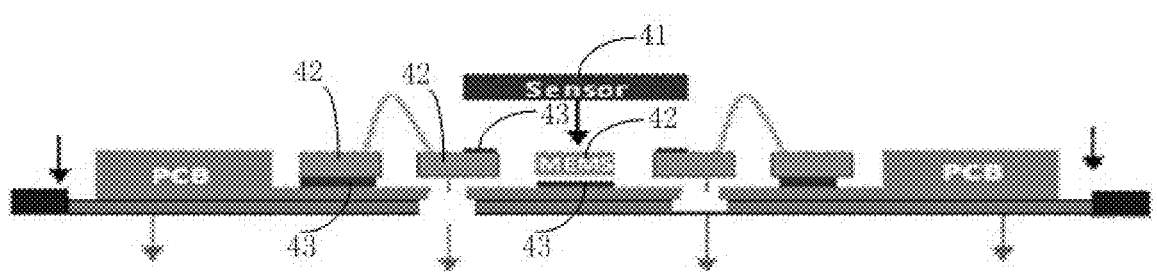
FIG. 4 is a schematic structural diagram of a micro-electromechanical optical image stabilization system according to an embodiment of the present disclosure.

As an example, referring to FIG. 4, FIG. 4 is a schematic structural diagram of a micro-electromechanical optical image stabilization system according to an embodiment of the present disclosure. The system may include: a photosensitive element 41, a micro-electromechanical system (MEMS) 42, and a glue 43, in which the photosensitive element 41 and the MEMS 42 are coupled using a chip-on-board technology and a dispensing method. The photosensitive element 42 may be controlled to move by the MEMS 42.

Figure 5:
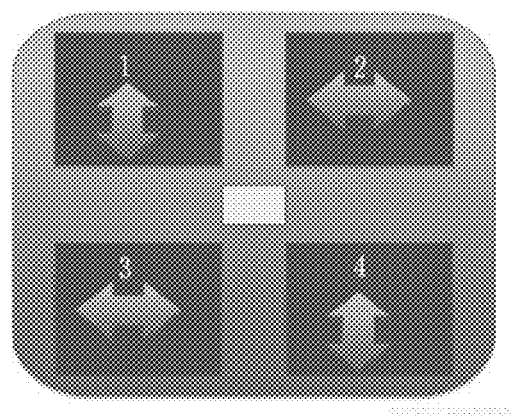
FIG. 5 is a top view showing a structure of a micro-electromechanical system (MEMS) according to an embodiment of the present disclosure.

Referring to FIG. 5, FIG. 5 is a top view showing a structure of a micro-electromechanical system (MEMS) 200 according to an embodiment of the present disclosure. The MEMS 200 may be translated upwards and downwards, left and right, and may be rotated with an angle. For example, when the MEMS 200 needs to move upwards and downwards, module 1 and module 4 take actions to cause the MEMS 200 to move upwards and downwards; when the MEMS 200 needs to move to the left and right, module 2 or module 3 take actions to cause the MEMS 200 to move to the left or right; when the MEMS 200 needs to rotate clockwise, the module 1 moves upwards, the module 2 moves to the right, the module 4 moves downwards, and the module 3 moves to the left, such that MEMS 200 rotates clockwise; similarly, when the MEMS 200 needs to rotate counterclockwise, the module 1 moves downwards, the module 2 moves to the left, the module 4 moves upwards, and the module 3 moves to the right.

According to actual needs, the movements in three-axis directions of the space rectangular coordinate system in the MEMS 200 (i.e., translating movements in two orthogonal directions in the horizontal plane, and a rotating movement around the axis perpendicular to the horizontal plane) may be realized by controlling the module 1, the module 2, the module 3, and/or the module 4, such that the MEMS 200 may pulls the photosensitive element 100 to generate the displacement at the initial position to compensate for the masked pixels during the process of photographing with the mobile terminal.

Figure 6:
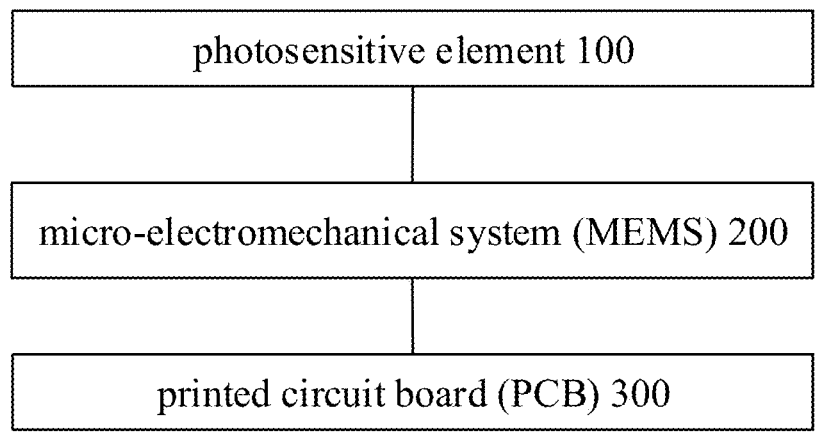
FIG. 6 is a schematic structural diagram of a micro-electromechanical optical image stabilization system according to another embodiment of the present disclosure.

In an embodiment, in some embodiments, referring to FIG. 6, the micro-electromechanical optical image stabilization system may also include: a printed circuit board (PCB) 300.

In embodiments of the present disclosure, the micro-electromechanical optical image stabilization system may also include the printed circuit board (PCB) 300 coupled to the MEMS 200.

In an embodiment, the PCB 300 and the MEMS 200 are coupled using a chip-on-board technology and a dispensing method.

In an embodiment, the PCB 300 is used to carry the weight of the MEMS 200 and the photosensitive element 100 and is used for routing.

Figure 7:
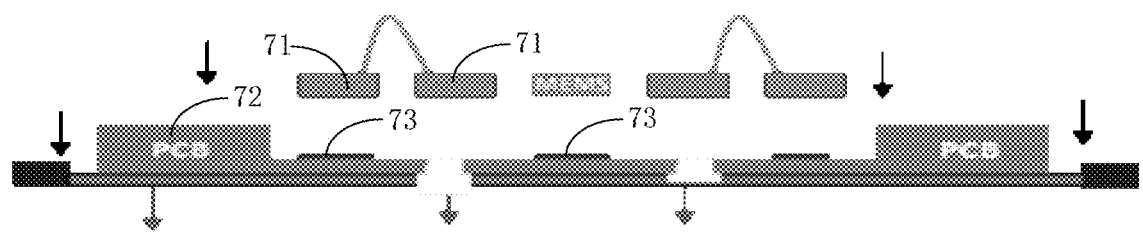
FIG. 7 is a schematic structural diagram of a micro-electromechanical optical image stabilization system according to another embodiment of the present disclosure.

As an example, referring to FIG. 7, FIG. 7 is a schematic structural diagram of a micro-electromechanical optical image stabilization system according to another embodiment of the present disclosure. The system may include: a micro-electromechanical system (MEMS) 71, a printed circuit board (PCB) 72, and a glue 73, in which the MEMS 71 is coupled to the PCB 72 using a chip-on-board technology and a dispensing method.

Figure 8:
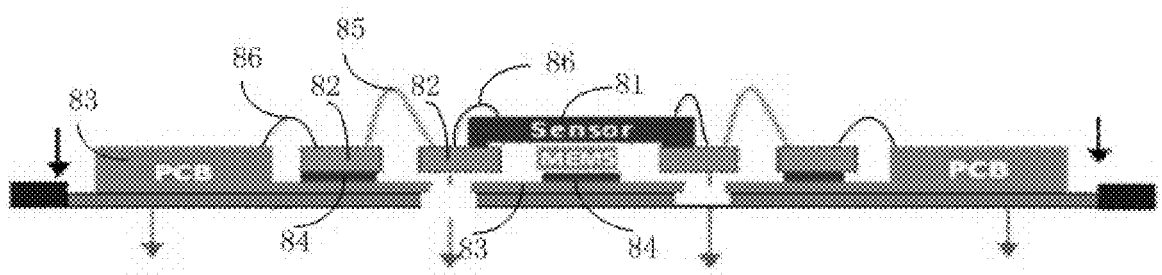
FIG. 8 is a structural diagram of another micro-electromechanical optical image stabilization system according to an embodiment of the present disclosure.

As an example, referring to FIG. 8, FIG. 8 is a structural diagram of another micro-electromechanical optical image stabilization system according to an embodiment of the present disclosure. The system may include: a photosensitive element 81, a micro-electromechanical system (MEMS) 82, a printed circuit board (PCB) 83, a glue 84, a silicon wire 85 and a gold wire 86, in which the silicon wire 85 is configured to carry the weight of the moving portion of the MEMS 82, the outer side of the silicon wire 85 is gold plated to generate electrical conductivity at the same time, and the silicon wire 85 is configured to transmit signals of the photosensitive element 81 and to supply power to the MEMS 82. The gold wire 86 is configured to transmit signals of the photosensitive element 81 and to supply power to the photosensitive element 81.

Figure 9:
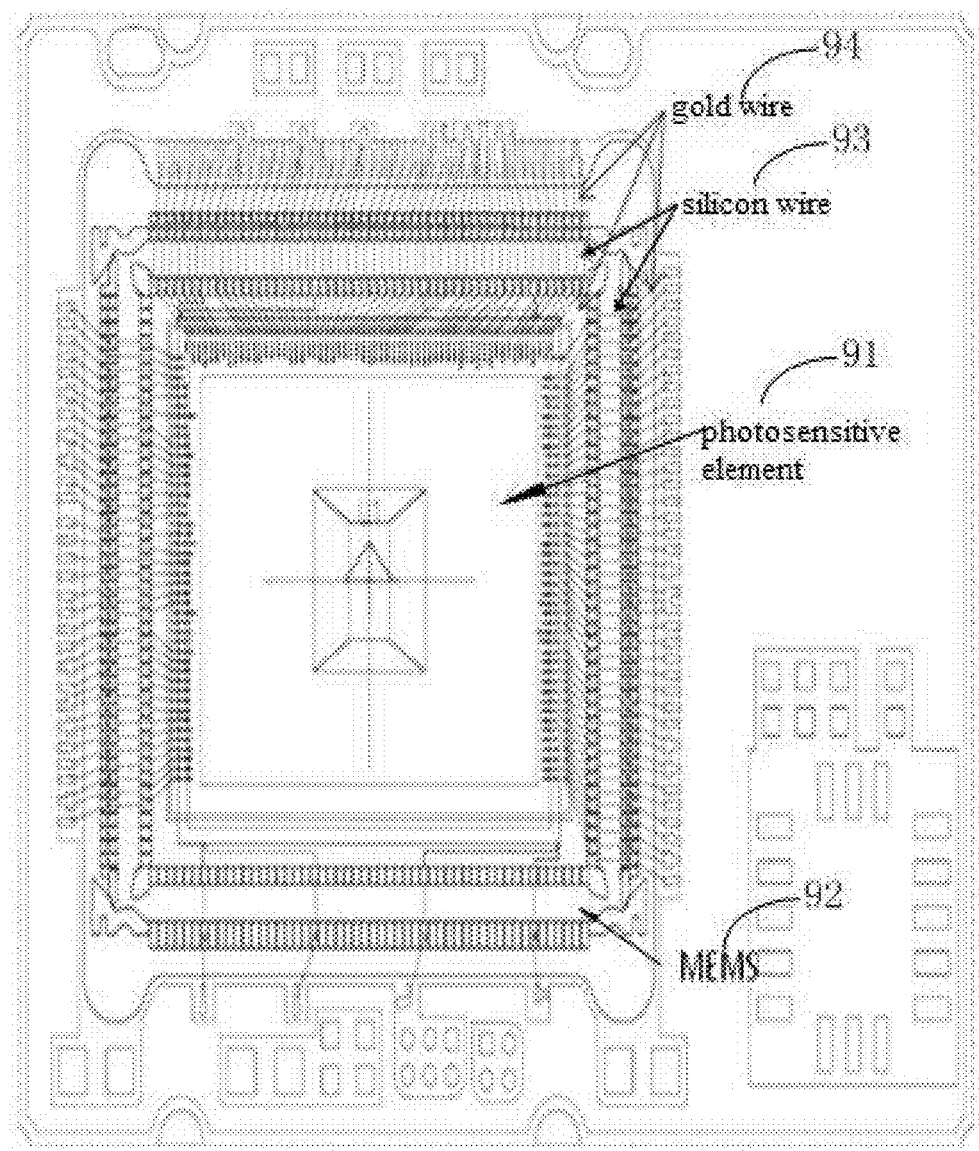
FIG. 9 is a top view showing a structure of a micro-electromechanical optical image stabilization system according to an embodiment of the present disclosure.

As an example, referring to FIG. 9, FIG. 9 is a top view showing a structure of a micro-electromechanical optical image stabilization system according to an embodiment of the present disclosure. The system may include: a photosensitive element 91, a micro-electromechanical system (MEMS) 92, a silicon wire 93 and a gold wire 94.

In this embodiment, a printed circuit board (PCB) is coupled to the MEMS, such that the PCB may carry the weight of the MEMS and the photosensitive element, and may supply power to the micro-electromechanical optical image stabilization system to ensure a normal operation of the micro-electromechanical optical image stabilization system.

In this embodiment, the photosensitive data of the object to be photographed may be collected by the photosensitive element, and the MEMS may control the photosensitive element to generate a displacement at the initial position. Therefore, the accuracy of phase focusing may be effectively improved, masked pixels may be compensated, and image blur caused by vibration of the mobile terminal may be effectively overcome.

Figure 10:
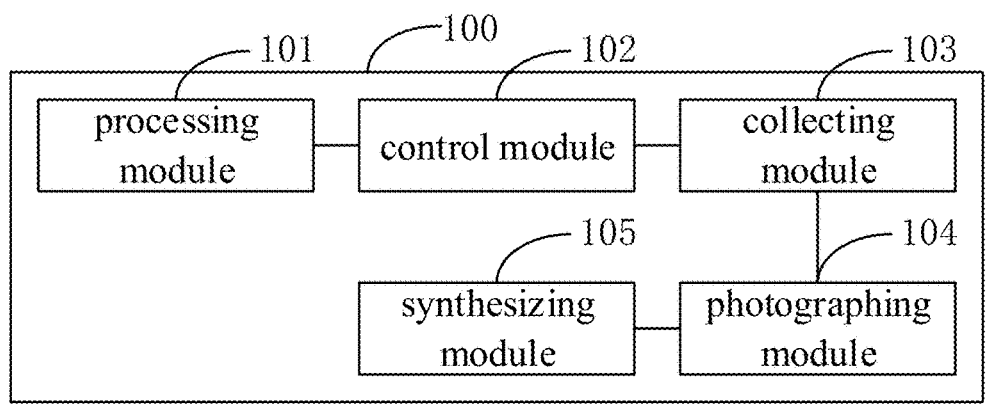
FIG. 10 is a schematic structural diagram of an image synthesis apparatus for a mobile terminal according to an embodiment of the present disclosure.

FIG. 10 is a schematic structural diagram of an image synthesis apparatus for a mobile terminal according to an embodiment of the present disclosure. The image synthesis apparatus 100 of the mobile terminal may be implemented by software, hardware or a combination thereof. The image synthesis apparatus 100 of the mobile terminal may include: a processing module 101, a control module 102, a collecting module 103, a photographing module 104, and a synthesizing module 105.

The processing module 101 is configured to perform a phase focusing on an object to be photographed based on a preset pixel of a photosensitive element in the mobile terminal when a user photographs the object to be photographed with the mobile terminal.

In an embodiment, the preset pixel is a masked pixel.

The control module 102 is configured to control the photosensitive element to generate a displacement at an initial location to replace the preset pixel by an original pixel, and to obtain a replaced pixel.

In an embodiment, the control module 102 is also configured to: control, by a micro-electromechanical optical image stabilization system, the photosensitive element to generate the displacement at the initial position.

The collecting module 103 is configured to collect first photosensitive data of the object to be photographed based on the replaced pixel, and to control the photosensitive element to return to the initial location.

The photographing module 104 is configured to photograph the object to be photographed, and to enable the photosensitive element to collect second photosensitive data of the object to be photographed at the initial location.

The synthesizing module 105 is configured to synthesize an image of the object to be photographed according to the first photosensitive data and the second photosensitive data.

In an embodiment, the synthesizing module 105 is also configured to: perform a compensation processing on the second photosensitive data with the first photosensitive data to synthesize the image of the object to be photographed according to the second photosensitive data subjected to the compensation processing.

It should be noted that, the description of embodiments of the image synthesis method for the mobile terminal in the foregoing embodiments of FIGS. 1-2 is also applicable to the image synthesis apparatus for the mobile terminal. The implementation principles thereof are similar, which will not be described in detail herein.

In this embodiment, the photosensitive element is controlled to generate a displacement at an initial position to replace the preset pixel by an original pixel and a replaced pixel is obtained. First photosensitive data of the object to be photographed may be collected based on the replaced pixel and the photosensitive element is controlled to return to the initial location, and the object to be photographed may be photographed, and the photosensitive element is enabled to collect second photosensitive data of the object to be photographed at the initial location. An image of the object to be photographed is synthesized according to the first photosensitive data and the second photosensitive data. Therefore, the accuracy of phase focusing may be effectively improved, masked pixels may be compensated, and image blur caused by vibration of the mobile terminal may be effectively overcome.

Embodiments of the disclosure also provide a mobile terminal. The mobile terminal may include a housing, a processor, a memory, a circuit board and a power supply circuit, in which the circuit board is disposed inside a space enclosed by the housing, the processor and the memory are disposed on the circuit board, the power supply circuit is configured to supplying power to circuits or components of the mobile terminal, the memory is configured to store executable program codes, the processor is configured to run a program corresponding to the executable program codes by reading the executable program codes stored in the memory to execute followings.

At block S11': a phase focusing is performed on an object to be photographed based on a preset pixel of a photosensitive element in the mobile terminal when a user photographs the object to be photographed with the mobile terminal.

In embodiments of the present disclosure, the mobile terminal may be a hardware device having various operating systems, such as a smart phone, a tablet computer, a personal digital assistant, an e-book and the like, which is not be limited herein.

In embodiments of the present disclosure, the object to be photographed may be a scene, a person, a thing and the like to be photographed by the user with the mobile terminal.

In embodiments of the present disclosure, the preset pixels are masked pixels, and the preset pixels are set in pairs.

In an embodiment, when the user photographs the object to be photographed with the mobile terminal, a phase focusing is performed on the object to be photographed based on the preset pixel of the photosensitive element in the mobile terminal. In other words, by reserving some masked pixels on the photosensitive element, the focusing offset value may be determined according to the distance between the pixels of the scene to be photographed and its changing factors, thereby achieving the phase focusing.

Referring to FIG. 2, FIG. 2 is a schematic diagram of preset pixels on a photosensitive element according to an embodiment of the present disclosure. For example, the pixels marked with letters in FIG. 2 may be preset pixels, and the preset pixels are set in pairs. For example, the preset pixels A, B, C, D, E, F, G, H, I, J may be marked as a preset pixel pair A and B, a preset pixel pair C and D, a preset pixel pair E and F, a preset pixel pair G and H, and a preset pixel pair I and J.

At block S12', the photosensitive element is controlled to generate a displacement at an initial location to replace the preset pixel by an original pixel, and a replaced pixel is obtained.

In embodiments of the disclosure, the photosensitive element may be controlled to generate a displacement at the initial position by a micro-electromechanical optical image stabilization system.

In embodiments of the present disclosure, the initial position is a position of the photosensitive element in the mobile terminal when the phase focusing is performed on the object to be photographed based on the preset pixel of the photosensitive element in the mobile terminal in the act of block S11'.

In embodiments of the present disclosure, the original pixel may be, for example, a default pixel when a masked pixel is not reserved on the photosensitive element in the mobile terminal, and the original pixel is, for example, a default pixel adjacent to the preset pixel.

In an embodiment, the movement of the photosensitive element may be controlled by the micro-electromechanical optical image stabilization system, such that the photosensitive element generates the displacement at the initial position to replace masked pixels by original pixels to obtain replaced pixels.

As an example, referring to FIG. 2, the pixels marked with letters in FIG. 2 are masked pixels, and after the micro-electromechanical optical image stabilization system controls the photosensitive element to generate displacement at the initial position, the replaced pixels may be obtained. In other words, by moving the position of the photosensitive element located under the color filter array, the movement of the photosensitive element relative to the color filter array may be caused, such that the photosensitive pixels corresponding to the same filter position before and after the movement are different, and the positions of those preset pixels (reserved masked pixels) before the movement are replaced by the original pixels (default pixels) after the movement.

At block S13', first photosensitive data of the object to be photographed are collected based on the replaced pixel, and the photosensitive element is controlled to return to the initial location.

In embodiments of the present disclosure, the first photosensitive data are photosensitive data collected when the mobile terminal photographs the object to be photographed based on the replaced pixels after the photosensitive element in the mobile terminal generates the displacement of at the initial position.

In embodiments of the present disclosure, after the first photosensitive data is collected, the photosensitive element may be controlled to return to the initial position to photograph the object to be photographed based on the preset pixel.

At block S14', the object to be photographed is photographed, and the photosensitive element is enabled to collect second photosensitive data of the object to be photographed at the initial location.

In embodiments of the present disclosure, when the photosensitive element is controlled to return to the initial position, the object to be photographed is photographed based on the preset pixel, such that the photosensitive element collects the photosensitive data of the object to be photographed at the initial position as the second photosensitive data.

In embodiments of the present disclosure, since the photosensitive element generates the displacement at the initial position, the original pixel is used to replace the masked pixel on the photosensitive element, and the obtained replaced pixel is the original pixel. Therefore, the mobile terminal may perform a compensation on the second photographic data based on the first photographic data so as to compensate for the masked pixel.

At block S15', an image of the object to be photographed is synthesized according to the first photosensitive data and the second photosensitive data.

In embodiments of the present disclosure, the second photosensitive data are subjected to compensation processing using the first photosensitive data to synthesize an image of the object to be photographed according to the compensated second photosensitive data.

In this embodiment, the photosensitive element is controlled to generate a displacement at an initial position to replace the preset pixel by an original pixel and a replaced pixel is obtained. First photosensitive data of the object to be photographed may be collected based on the replaced pixel and the photosensitive element is controlled to return to the initial location, and the object to be photographed may be photographed, and the photosensitive element is enabled to collect second photosensitive data of the object to be photographed at the initial location. An image of the object to be photographed is synthesized according to the first photosensitive data and the second photosensitive data. Therefore, the accuracy of phase focusing may be effectively improved, masked pixels may be compensated, and image blur caused by vibration of the mobile terminal may be effectively overcome.

The above embodiments of the apparatuses are exemplary. Units described as separate components may be or may not be physically separated. Components shown as units may be or may not be physical units, in other words, may be integrated on one position or distributed to a plurality of network units. Some or all of the modules may be selected to achieve the objective of the solution of the embodiments according to actual requirements. Those skilled in the art may understand and implement the present disclosure without making creative efforts.

The steps in the method of embodiments of the present disclosure may be sequentially adjusted, merged, and deleted according to actual needs.

Modules or units in the apparatus of embodiments of the present disclosure may be combined, divided, and deleted according to actual needs.

The modules or modules of embodiments of the present disclosure may be implemented by a general-purpose integrated circuit (such as a central processing unit CPU) or by an application specific integrated circuit (ASIC).

Through the description of the above embodiments, those skilled in the art may clearly understand that the various implementations may be implemented by means of software plus a necessary general hardware platform, and of course, by hardware. Based on such understanding, the above-described technical solutions may be embodied in the form of software products in essence or in the form of software products, which may be stored in a computer readable storage medium such as ROM/RAM, magnetic discs, optical discs, etc. and include instructions for causing a computer device (which may be a personal computer, a server, or a network device, etc.) to perform the methods described in various embodiments or portions of the embodiments.

The embodiments described above do not constitute a limitation on the scope of the technical solutions. Any modifications, equivalent substitutions and improvements made within the spirit and principles of the above-described embodiments are intended to be included within the scope of the technical solutions.

What is claimed is:

1. An image synthesis method for a mobile terminal, comprising:
    performing a phase focusing on an object to be photographed based on a preset pixel of a photosensitive element in the mobile terminal when a user photographs the object to be photographed with the mobile terminal;
    controlling the photosensitive element to generate a displacement at an initial location to replace the preset pixel by an original pixel, and obtaining a replaced pixel;
    collecting first photosensitive data of the object to be photographed based on the replaced pixel, and controlling the photosensitive element to return to the initial location, wherein the photosensitive element is controlled to generate the displacement at the initial location and to return to the initial location by at least two modules configured in the mobile terminal collaboratively, wherein the photosensitive element is controlled to be moved upwards and downwards by a first module and a fourth module, to be moved left and right by a second module and a third module, and to be rotated with an angle by the first module, the second module, the third module and the fourth module;
    photographing the object to be photographed, and enabling the photosensitive element to collect second photosensitive data of the object to be photographed at the initial location; and
    synthesizing an image of the object to be photographed according to the first photosensitive data and the second photosensitive data.

2. The image synthesis method according to claim 1, controlling the photosensitive element to generate the displacement at the initial location comprising:
    controlling, by a micro-electromechanical optical image stabilization system, the photosensitive element to generate the displacement at the initial location.

3. The image synthesis method according to claim 1, synthesizing the image of the object to be photographed according to the first photosensitive data and the second photosensitive data comprising:
    performing a compensation processing on the second photosensitive data with the first photosensitive data to synthesize the image of the object to be photographed according to the second photosensitive data subjected to the compensation processing.

4. The image synthesis method according to claim 1, wherein the preset pixel is a masked pixel.

5. A micro-electromechanical optical image stabilization system, comprising:
    a photosensitive element, configured to collect photosensitive data of an object to be photographed; and
    a micro-electromechanical system coupled to the photosensitive element, configured to control the photosensitive element to generate a displacement at an initial position and to return to the initial location by at least two modules configured in the micro-electromechanical optical image stabilization system collaboratively, wherein the photosensitive element is controlled to be moved upwards and downwards by a first module and a fourth module, to be moved left and right by a second module and a third module, and to be rotated with an angle by the first module, the second module, the third module and the fourth module.

6. The micro-electromechanical optical image stabilization system according to claim 5, further comprising:
    a printed circuit board coupled to the micro-electromechanical system.

7. The micro-electromechanical optical image stabilization system according to claim 5, wherein the photosensitive element and the micro-electromechanical system are coupled using a chip-on-board technology and a dispensing method.

8. The micro-electromechanical optical image stabilization system according to claim 6, wherein the printed circuit board and the micro-electromechanical system are coupled using a chip-on-board technology and a dispensing method.

9. The micro-electromechanical optical image stabilization system according to claim 7, wherein a masked pixel is set on the photosensitive element, and the masked pixel is configured to perform a phase focusing on the object to be photographed.

10. A mobile terminal, comprising: a housing, a processor, a memory, a circuit board and a power supply circuit, wherein,
    the circuit board is disposed inside a space enclosed by the housing, the processor and the memory are disposed on the circuit board, the power supply circuit is configured to supplying power to circuits or components of the mobile terminal, the memory is configured to store executable program codes, the processor is configured to run a program corresponding to the executable program codes by reading the executable program codes stored in the memory to execute:
        performing a phase focusing on an object to be photographed based on a preset pixel of a photosensitive element in the mobile terminal when a user photographs the object to be photographed with the mobile terminal;

controlling the photosensitive element to generate a displacement at an initial location to replace the preset pixel by an original pixel, and obtaining a replaced pixel;

collecting first photosensitive data of the object to be photographed based on the replaced pixel, and controlling the photosensitive element to return to the initial location, wherein the photosensitive element is controlled to generate the displacement at the initial location and to return to the initial location by at least two modules configured in the mobile terminal collaboratively, wherein the photosensitive element is controlled to be moved upwards and downwards by a first module and a fourth module, to be moved left and right by a second module and a third module, and to be rotated with an angle by the first module, the second module, the third module and the fourth module;

photographing the object to be photographed, and enabling the photosensitive element to collect second photosensitive data of the object to be photographed at the initial location; and synthesizing an image of the object to be photographed according to the first photosensitive data and the second photosensitive data.

11. The mobile terminal according to claim 10, wherein the processor is further configured to:
control the photosensitive element to generate the displacement at the initial location by a micro-electromechanical optical image stabilization system.

12. The mobile terminal according to claim 10, wherein the processor is further configured to:
perform a compensation processing on the second photosensitive data with the first photosensitive data to synthesize the image of the object to be photographed according to the second photosensitive data subjected to the compensation processing.

13. The mobile terminal according to claim 10, wherein the preset pixel is a masked pixel.

14. The image synthesis method according to claim 2, controlling, by the micro-electromechanical optical image stabilization system, the photosensitive element to generate the displacement at the initial location comprising:
controlling, by the micro-electromechanical optical image stabilization system, the photosensitive element to generate the displacement at the initial location via movements in three-axis directions of a space rectangular coordinate system, the movements in the three-axis directions comprising translating movements in two orthogonal directions in a horizontal plane and a rotating movement around an axis perpendicular to the horizontal plane.

15. The image synthesis method according to claim 14, wherein the micro-electromechanical optical image stabilization system comprises a micro-electromechanical system having the first module, the second module, the third module and the fourth module, and
when performing the rotating movement, the method comprises at least one of:
controlling the first module to move upwards, the second module to move to the right, the third module to move to the left, and the fourth module to move downwards, so as to cause the micro-electromechanical system to rotate clockwise; and
controlling the first module to move downwards, the second module to move to the left, the third module to move to the right, and the fourth module to moves upwards, so as to cause the micro-electromechanical system to rotate counterclockwise; and
when performing the translating movements, the method comprises at least one of:
controlling the first module and the fourth module to take actions to cause the micro-electromechanical system to move upwards and downwards; and
controlling the second module and the third module to take actions to cause the micro-electromechanical system to move to the left and right.

16. The image synthesis method according to claim 1, wherein the initial position is a position of the photosensitive element in the mobile terminal when the phase focusing is performed on the object to be photographed based on the preset pixel of the photosensitive element in the mobile terminal, and the original pixel is a default pixel where a masked pixel is not reserved on the photosensitive element in the mobile terminal.

17. The micro-electromechanical optical image stabilization system according to claim 5, wherein the micro-electromechanical system is configured to control the photosensitive element to generate the displacement at the initial position by performing an act of:
controlling the photosensitive element to generate the displacement at the initial location via movements in three-axis directions of a space rectangular coordinate system, the movements in the three-axis directions comprising translating movements in two orthogonal directions in a horizontal plane and a rotating movement around an axis perpendicular to the horizontal plane.

18. The micro-electromechanical optical image stabilization system according to claim 17, wherein the micro-electromechanical optical image stabilization system comprises a micro-electromechanical system having the first module, the second module, the third module and the fourth module, and
when performing the rotating movement, the micro-electromechanical optical image stabilization system is configured to perform at least one of:
controlling the first module to move upwards, the second module to move to the right, the third module to move to the left, and the fourth module to move downwards, so as to cause the micro-electromechanical system to rotate clockwise; and
controlling the first module to move downwards, the second module to move to the left, the third module to move to the right, and the fourth module to moves upwards, so as to cause the micro-electromechanical system to rotate counterclockwise; and
when performing the translating movements, the micro-electromechanical optical image stabilization system is configured to perform at least one of:
controlling the first module and the fourth module to take actions to cause the micro-electromechanical system to move upwards and downwards; and
controlling the second module and the third module to take actions to cause the micro-electromechanical system to move to the left and right.

19. The micro-electromechanical optical image stabilization system according to claim 5, further comprising:
a silicon wire, configured to carry a weight of a moving portion of the micro-electromechanical system, and to transmit a signal of the photosensitive element and to supply power to the micro-electromechanical system; and a gold wire, configured to transmit the signal of the photosensitive element and to supply power to the photosensitive element.

20. The micro-electromechanical optical image stabilization system according to claim 6, the printed circuit board being configured to carry weights of the micro-electromechanical system and the photosensitive element, the printed circuit board being further configured for routing.

* * * * *